(12) United States Patent
Robbins

(10) Patent No.: US 9,672,010 B2
(45) Date of Patent: Jun. 6, 2017

(54) UNIFIED MODELING LANGUAGE (UML) ANALYSIS SYSTEM AND METHOD

(71) Applicant: THE BOEING COMPANY, Chicago, IL (US)

(72) Inventor: Harold Albert Robbins, Colorado Springs, CO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/811,894

(22) Filed: Jul. 29, 2015

(65) Prior Publication Data

US 2017/0031657 A1 Feb. 2, 2017

(51) Int. Cl.
G06F 9/44 (2006.01)
G06F 9/45 (2006.01)

(52) U.S. Cl.
CPC .......... *G06F 8/10* (2013.01); *G06F 8/40* (2013.01); *G06F 8/20* (2013.01); *G06F 8/35* (2013.01)

(58) Field of Classification Search
CPC ............................................. G06F 8/10–8/40
See application file for complete search history.

(56) References Cited

U.S. PATENT DOCUMENTS

| 6,684,386 B1* | 1/2004 | Baisley | G06F 9/4433 717/100 |
| 2005/0149868 A1* | 7/2005 | Katayama | G06F 8/38 715/700 |
| 2007/0067756 A1* | 3/2007 | Garza | G06F 8/10 717/136 |
| 2007/0156601 A1* | 7/2007 | Brew | G06F 21/10 705/57 |
| 2007/0198968 A1* | 8/2007 | Shenfield | G06F 8/10 717/104 |
| 2008/0229253 A1* | 9/2008 | Carteri | G06F 17/30873 715/854 |
| 2009/0007061 A1* | 1/2009 | Ben-Zvi | G06F 8/10 717/105 |

(Continued)

OTHER PUBLICATIONS

Photchana Sawprakhon, Sequence Diagram Generation with Model Transformation Technology, 2014, pp. 1-6.*

(Continued)

*Primary Examiner* — Thuy Dao
*Assistant Examiner* — Mongbao Nguyen
(74) *Attorney, Agent, or Firm* — Joseph M. Butscher; The Small Patent Law Group, LLC

(57) ABSTRACT

A universal modeling language (UML) analysis method may include importing a plurality of tool-specific UML models from a plurality of UML tools. The tool-specific UML models are in different tool-specific formats. The method may also include capturing snapshots, which may include text data and diagrams, of the plurality of tool-specific UML models. The method may also include translating each of the tool-specific UML models into a transformed UML model having a universal UML format. The translating operation may include extracting base data and one or more associated extended elements from the tool-specific UML model. The method may also include storing the transformed UML models within a UML tool database.

18 Claims, 6 Drawing Sheets

(56) References Cited

U.S. PATENT DOCUMENTS

| | | | | |
|---|---|---|---|---|
| 2009/0144703 | A1* | 6/2009 | Vairavan | G06F 8/20 717/122 |
| 2010/0107135 | A1* | 4/2010 | Arsanjani | G06Q 10/067 717/104 |
| 2010/0175054 | A1* | 7/2010 | Matusikova | G06F 17/227 717/136 |
| 2011/0004862 | A1* | 1/2011 | Kejriwal | G06F 8/10 717/104 |
| 2011/0239183 | A1* | 9/2011 | Paradkar | G06F 8/10 717/104 |
| 2011/0265060 | A1* | 10/2011 | Fritzsche | G06F 8/10 717/104 |
| 2012/0042299 | A1* | 2/2012 | Perrin | G06F 8/10 717/104 |
| 2012/0123990 | A1* | 5/2012 | Eckardt | G06F 8/10 706/47 |
| 2013/0174116 | A1* | 7/2013 | Pfeifer | G06F 8/35 717/104 |
| 2013/0290923 | A1* | 10/2013 | Griffith | G06F 8/35 717/104 |
| 2014/0013297 | A1* | 1/2014 | Cook | G06F 8/33 717/105 |
| 2014/0109037 | A1* | 4/2014 | Ouali | G06F 8/10 717/105 |
| 2014/0331212 | A1* | 11/2014 | Gaikwad | G06F 11/3684 717/131 |
| 2015/0095877 | A1* | 4/2015 | Lin | G06F 8/35 717/104 |
| 2015/0100942 | A1* | 4/2015 | Misbhauddin | G06F 8/72 717/104 |
| 2015/0370539 | A1* | 12/2015 | Nair | G06F 8/20 717/105 |

OTHER PUBLICATIONS

Osmar M. dos Santos, Using Model Transformation to Generate Graphical Counter-Examples for the Formal Analysis of xUML Models, 2011, pp. 117-126.*

Johann Hufnagel, Institute of Automation and Information Systems, Framework for a Model-Based, Cross-Domain System Interconnection in Automation Technology, 2013, pp. 1-9.*

Hafsteinn Por Einarsson, Refactoring UML Diagrams and Models with Model-to-Model Transformations, Faculty of Industrial Engineering, Mechanical Engineering and Computer Science, University of Iceland, 2011, pp. 27-29.*

Jon Oldevik, UMT UML Model Transformation Tool, UMT documentation, 2004, pp. 1-33.*

Alexander Christoph, Great: UML transformation tool for porting middleware applications, 2008, pp. 1-10.*

* cited by examiner

FIG. 6

UNIFIED MODELING LANGUAGE (UML) ANALYSIS SYSTEM AND METHOD

FIELD OF THE DISCLOSURE

Embodiments of the present disclosure generally relate to systems and methods for analyzing unified modeling language (UML) data.

BACKGROUND OF THE DISCLOSURE

Unified Modeling Language (UML) is a general-purpose modeling language that is used to provide a standard way to visualize the design of a system, and is currently managed by the Object Management Group (OMG). UML provides visualization of components of a particular system in one or more diagrams. For example, UML allows for visualization of activities, components of a system, interactions with software, how a system runs, how entities interact with other, external user interfaces, and the like.

Originally, UML was developed to define a common set of tools that individuals could use to define a system. The common set of tools and techniques were intended to allow individuals to work on different projects and use past experience to facilitate future projects, or utilize previously-performed work.

Notably, rules for implementing UML are defined by OMG. However, methods for implementation of the rules are not mandated. As such, tool vendors developed and utilize different tools to construct diagrams, capture data, and correlate the data with the diagrams. Differences between the tools used by separate and distinct tool vendors decreases the intended benefit of UML, and generally increases the learning curve for use of a new model. For example, there is generally a learning curve when moving to a model that was constructed with a different tool.

OMG attempted to rectify this issue through XMI (XML Metadata Interchange). XMI is a file format used to move model data (data alone, not diagrams) between tools. However,)(MI does not include diagram data. Therefore, only model data is transferred. While there are a few vendor-specific extensions of XMI that are used to move diagram data, using such extensions is labor intensive. For example, an individual typically adjusts or redraws diagrams created with a first tool in relation to a second tool that differs from the first tool.

Additionally, tool makers often add extensions to their UML implementation. The extensions are typically added to the XMI files, but the receiving tool is generally unable to understand the extension, and therefore discards the data.

Also, an exporting tool interprets and exports the data into the XMI, while an importing tool displays XMI data as the importing tool interprets the XMI data. Consequently, however, an imported model differs from the exported model.

Further, there are typically numerous XMI files for every project. Yet, stand-alone XMI files generally cannot be viewed by end users. As such, the stand-alone XMI files are typically unable to be analyzed.

In short, multiple UML tools exist. Each UML tool includes a unique protocol for storing data and images. A need exists for a system and method for quickly and easily gaining access to information from UML tools.

SUMMARY OF THE DISCLOSURE

Certain embodiments of the present disclosure provide a universal modeling language (UML) analysis system that may include at least one processor, and a memory coupled to the processor(s). The memory stores program instructions that are executable by the processor(s) to import at least one tool-specific UML model from at least one UML tool, and translate the tool-specific UML model(s) into at least one transformed UML model having a universal UML format.

The system may also include a UML tool database. The processor(s) is configured to store the transformed UML model(s) within the UML tool database. The transformed UML model(s) may include text data correlated with at least one diagram.

In at least one embodiment, the program instructions are executable by the processor(s) to capture a snapshot of the tool-specific UML model(s). The snapshot may include text data and at least one diagram.

The system may also include at least one transforming mechanism configured to translate the tool-specific UML model(s) into the universal UML format. In at least one embodiment, the transforming mechanism(s) may include at least one plugin coupled to the UML tool(s). In at least one embodiment, the transforming mechanism(s) may be coupled to the at least one processor. The transforming mechanism may be configured to extract base data and one or more associated extended elements from the tool-specific UML model.

The system may also include a monitor coupled to the processor(s). The processor(s) is configured to display a model navigation interface on the monitor, and display particular model elements based on commands input through the model navigation interface.

In at least one embodiment, the program instructions are executable by the processor(s) to import a plurality of tool-specific UML models from a plurality of UML tools. The UML models may be in different tool-specific formats. The program instructions are executable by the processor(s) to translate the plurality of tool-specific UML models into a plurality of transformed UML models. Each of the transformed UML models is in the universal UML format.

Certain embodiments of the present disclosure provide a universal modeling language (UML) analysis method that may include importing at least one tool-specific UML model from at least one UML tool, and translating the tool-specific UML model(s) into at least one transformed UML model having a universal UML format.

The method may also include storing the transformed UML model(s) within a UML tool database. The method may also include capturing a snapshot of the tool-specific UML model(s). The method may also include translating the tool-specific UML model(s) into the universal UML format with at least one transforming mechanism. The translating operation may include extracting base data and one or more associated extended elements from the tool-specific UML model(s). The method may also include displaying a model navigation interface on a monitor, and displaying particular model elements based on commands input through the model navigation interface.

Certain embodiments of the present disclosure provide a universal modeling language (UML) analysis method that may include importing a plurality of tool-specific UML models from a plurality of UML tools. The plurality of tool-specific UML models may be in different tool-specific formats. The method may also include capturing snapshots of the plurality of tool-specific UML models, translating each of the plurality of tool-specific UML models into a transformed UML model having a universal UML format, storing the transformed UML models within a UML tool database, displaying a model navigation interface on a monitor, and displaying particular model elements based on commands input through the model navigation interface.

BRIEF DESCRIPTION OF THE DRAWINGS

FIG. 6 illustrates a UML model data layout displayed on a monitor, according to an embodiment of the present disclosure.

DETAILED DESCRIPTION OF THE DISCLOSURE

Figure 1:
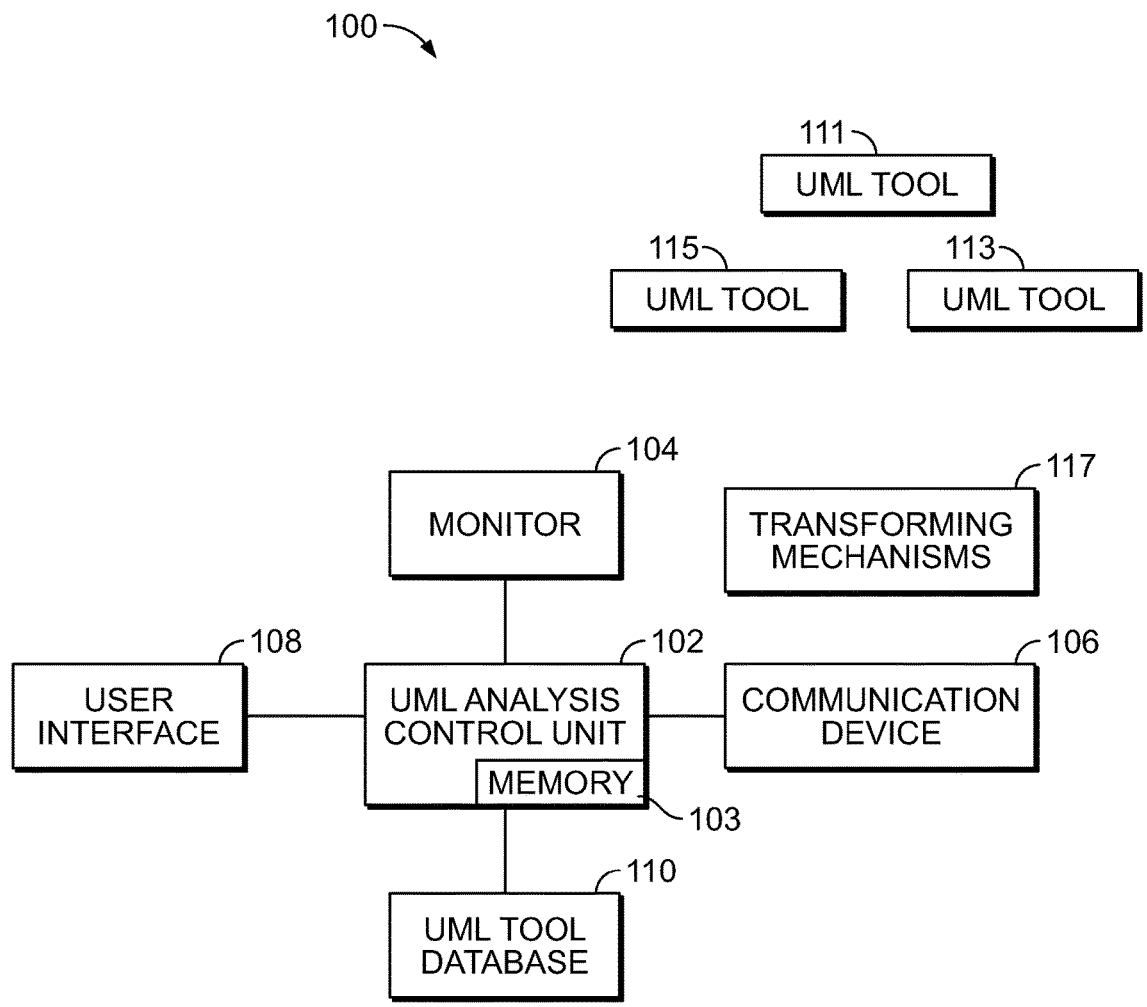
FIG. 1 illustrates a schematic block diagram of a UML analysis system, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a system and method that may utilize an application programming interface (API), for example, to extract and save data of extended elements. In at least one embodiment, a UML analysis control unit, which may be or include a plugin, may be used. The UML analysis control unit may include a memory that stores information regarding a source tool, for example, such as a UML model created with the source tool. As such, ambiguity is eliminated, minimized, or otherwise reduced as the UML analysis control unit is programmed to recognize a source tool and/or a destination repository, for example. In at least one embodiment, the UML analysis control unit may iterate or otherwise cycle through model elements in a model, determine a UML primitive, and save it as primitive data within the repository, such as a UML tool database. Enhanced information related to the UML primitive may be stored in an enhanced information storage component of the repository.

A UML primitive generally has no internal structure. The UML primitive may be defined externally to UML. For example, an integer is an example of a primitive. Operations related to the UML primitive may be defined by implementation language.

In at least one embodiment, the system and method may utilize diagram images formed by a tool of a particular tool vendor, instead of re-rendering the image using diagram metadata. Accordingly, the system and method allow for accurate display of the diagram without any diagram rework.

The system and method may also utilize a common viewer or interface. Thus, the system and method are configured to generate a common user experience for viewing the data. The hierarchy of data elements (intrinsic to UML modeling) may be displayed, thereby allowing a user to navigate to desired diagrams or model elements. The common viewer may allow for display of a baseline, a UML primitive, metadata for the model element, and the like. Additional extended metadata originally entered with a specific vendor tool may be extracted from the enhanced information storage and displayed. As such, data received from the vendor tool is not lost.

The system and method may utilize a common data store, such as a UML tool database. The common data store allows analysts (such as quality control, program management, or subject matter experts) to quickly query the model information using standard queries across multiple projects.

Certain embodiments of the present disclosure provide a system and method that are configured to capture an image of UML base data and extended data for storing on a repository for universal viewing of different UML tools data. In at least one embodiment, a method for providing a source agnostic unified modeling language (UML) viewing tool for viewing models generated by different UML tools may include providing a repository for importing and storing a plurality of UML model data and images from different UML tools. A native format is that which is defined and generated by a specific UML tool of a specific UML tool vendor. The importing of the plurality of UML model data and images may include taking a snapshot (for example, saving an image) of each of the UML models including text and images. The snapshot may include a universal data store scheme including diagram images in computer viewable image format, such as bmp, jpg, wmf, png, raw model data, or a combination thereof. The taking a snapshot operation may also include using a plugin that utilizes the source different UML tool application programming interface (API), extracting a base data and a plurality of associated extended elements (in which the snapshot may include a snapshot of both the base data and the extended elements), and storing the snapshot of UML models in the repository categorized under a filing format including a plurality of sortable data categories. The method may also include providing the viewing tool for accessing the repository containing the snapshots of UML models originating from the different UML tools.

Examples of the different UML tools include Rhapsody (which stores data in multiple proprietary formatted text files), Rational Software Architect (RSA) (which stores data in multiple XML files), Enterprise Architect (which stores data in a Microsoft relational database), Visio, Rational Rose, or IBM System Architect.

Embodiments of the present disclosure provide a source-agnostic UML analysis system. Embodiments of the present disclosure provide a system and method for translating data from various UML tools into a universal base format, for example. In short, embodiments of the present disclosure may be configured to receive data from various different UML tools and translate the received data into a universal UML format.

FIG. 1 illustrates a schematic block diagram of a UML analysis system 100, according to an embodiment of the present disclosure. The UML analysis system 100 may include a UML analysis control unit 102 operatively coupled to a monitor 104, a communication device 106, a user interface 108, and a UML tool database 110. For example, the UML analysis control unit 102 may be communicatively coupled to each of the monitor 104, the communication unit 106, the user interface 108, and the UML tool database 110 through one or more wired or wireless connections. In at least one embodiment, all of the components of the system 100 may be contained in a single housing, such as that of a computer. In at least one other embodiment, at least some of the components of the system 100 may be remotely located from other components. For example, the UML analysis control unit 102 may be contained within a computer that may communicate with the UML tool database 110, which may be located at a remote location, through the Internet, for example.

The UML analysis control unit 102 may be or include at least one processor. A memory 103 may be coupled to the processor(s). The memory 103 stores program instructions. The program instructions are executable by the processor(s) to perform various operations, as described below.

As noted, the system 100 may be contained within a housing, such as that of a personal computer, laptop computer, handheld device (such as a smart phone or tablet), and/or the like. Optionally, the housing may be unique to the system 100, such as a unique handheld housing specifically designed for the system 100.

The communication device 106 may be a device, such as a modem, antenna, broadband connection, transceiver, and/or the like, that is configured to allow the system 100 to communicate with one or more UML tools 111, 113, and 115 (more or less UML tools than shown may be in communication with the system 100), such as through the internet, radio frequency communications, wired or wireless connections, and/or the like. Optionally, the system 100 may not include the monitor 104, the communication device 106, and/or the user interface 108, but may instead be or include hardware, software, firmware, and/or the like that is configured to operatively couple to a another computing system, such as a personal computer, laptop computer, smart device, and/or the like.

Each UML tool 111, 113, and 115 may be or include a utility used to allow an individual to define a particular system. Examples of UML tools include Rhapsody, Rational Software Architect (RSA), Enterprise Architect, Visio, Rational Rose, and IBM System Architect. Each UML tool 111, 113, and 115 may include or be operatively coupled to a plugin that allows diagrams to be constructed and data assigned to the diagrams.

A UML model represents data. The diagrams are visualizations of the data in which text from the UML model is associated with the diagrams.

The monitor 104 may be or otherwise include a television, computer monitor, or the like. In at least one embodiment, the monitor 104 may include a plasma, liquid crystal display, light emitting diode, or the like screen. The monitor 104 is configured to present information to a user and allow the user to interact with the system 100, such as through the user interface 108.

The user interface 108 is configured to allow a user to interact with the system 100, such as through input commands. The user interface 108 may be or include a keyboard, mouse, touchscreen (which may be integrated with the monitor 104), touchpad, and/or the like.

The UML analysis control unit 102 is configured to receive (for example, import) information related to the UML tools 111, 113, and 115 through the communication device 106, and store it within the UML tool database 110. For example, the UML analysis control unit 102 is configured to receive tool-specific UML models from the UML tools 111, 113, and 115. In at least one embodiment, the UML tool database 110 is separate and distinct from the UML analysis control unit 102. In at least one other embodiment, the UML analysis control unit 102 may include the UML tool database 110, or vice versa.

The UML database 110 may include a primitive data repository and an enhanced information storage unit. The primitive data repository and the enhanced information storage unit may be separate and distinct structures within the UML database 110. In at least one other embodiment, the primitive data repository and the enhanced information storage unit may be integrated into a single structure within the UML tool database 110.

As noted, components of the system 100 may be separate and distinct from one another. For example, the components (such as the UML analysis control unit 102 and the UML database 110) may be in communication with one another through one or more wired or wireless connections. In at least one embodiment, the components may be part of a single integrated chip. In at least one other embodiment, the components may be part of multiple integrated chips. Also, alternatively, all of the components may be part of a single central processing or control unit that is configured to perform the functions associated with each component.

The system 100 may include one or more processors configured to perform the functions described in the present application. For example, in at least one embodiment, one or more of the components may be or include a separate and distinct processor and memory configured to perform the respective operations described herein. In at least one other embodiment, a single processor or multiple processors may be configured to perform the operations described in the present application.

One or more of the components of the system 100 may be contained within a housing that may be or otherwise include one or more computing devices, such as standard computer hardware (for example, processors, circuitry, memory, and the like). One or more of the components of the system 100 may each or collectively include one or more control units, circuits, or the like, such as processing devices that may include one or more microprocessors, microcontrollers, integrated circuits, memory, such as read-only and/or random access memory, and the like. As an example, the UML analysis control unit 102 may include or be formed as an integrated chip. One or more of the components may be separate and distinct circuits or processors within the system 100, for example.

As used herein, the term "controller," "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor capable of executing the functions described herein. Such are exemplary only, and are thus not intended to limit in any way the definition and/or meaning of such terms.

The UML analysis control unit 102, for example, is configured to execute a set of instructions that are stored in one or more storage elements (such as one or more memories), in order to process data. For example, the UML analysis control unit 102 may include or be coupled to one or more memories. The storage elements may also store data or other information as desired or needed. The storage element may be in the form of an information source or a physical memory element within a processing machine.

The set of instructions may include various commands that instruct the UML analysis control unit 102 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units. It is to be understood that the processing or control units may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units may represent processing circuitry such as one or more of a field programmable gate array (FPGA), an application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The UML tool database 110 may be a generic database that is configured to store data related to the separate and distinct UML tools 111, 113, and 115. For example, the UML analysis control unit 102 may import tool-specific UML models from each of the UML tools 111, 113, and 115 and store transformed and translated versions of the UML models within the UML tool database 110. In at least one embodiment, the UML tools 111, 113, and 115, and/or the UML analysis control unit 102 may be coupled to one or more specific tool plugins, for example. The UML analysis control unit 102 is configured to provide a tool agnostic viewer on the monitor 104. The tool agnostic viewer provides a general UML viewer that displays data from the various UML tools 111, 113, and 115 in a translated, non-tool specific (that is, agnostic) format.

The UML tool database 110 may be based on UML infrastructure (such as UML2 infrastructure) and may store model data information and visualization information. In at least one embodiment, the model data information may be represented by relational database tables transformed from original class diagrams. In general, the model data information may be generated from multiple sources. A class diagram may be an aspect of the model data information.

Figure 2:
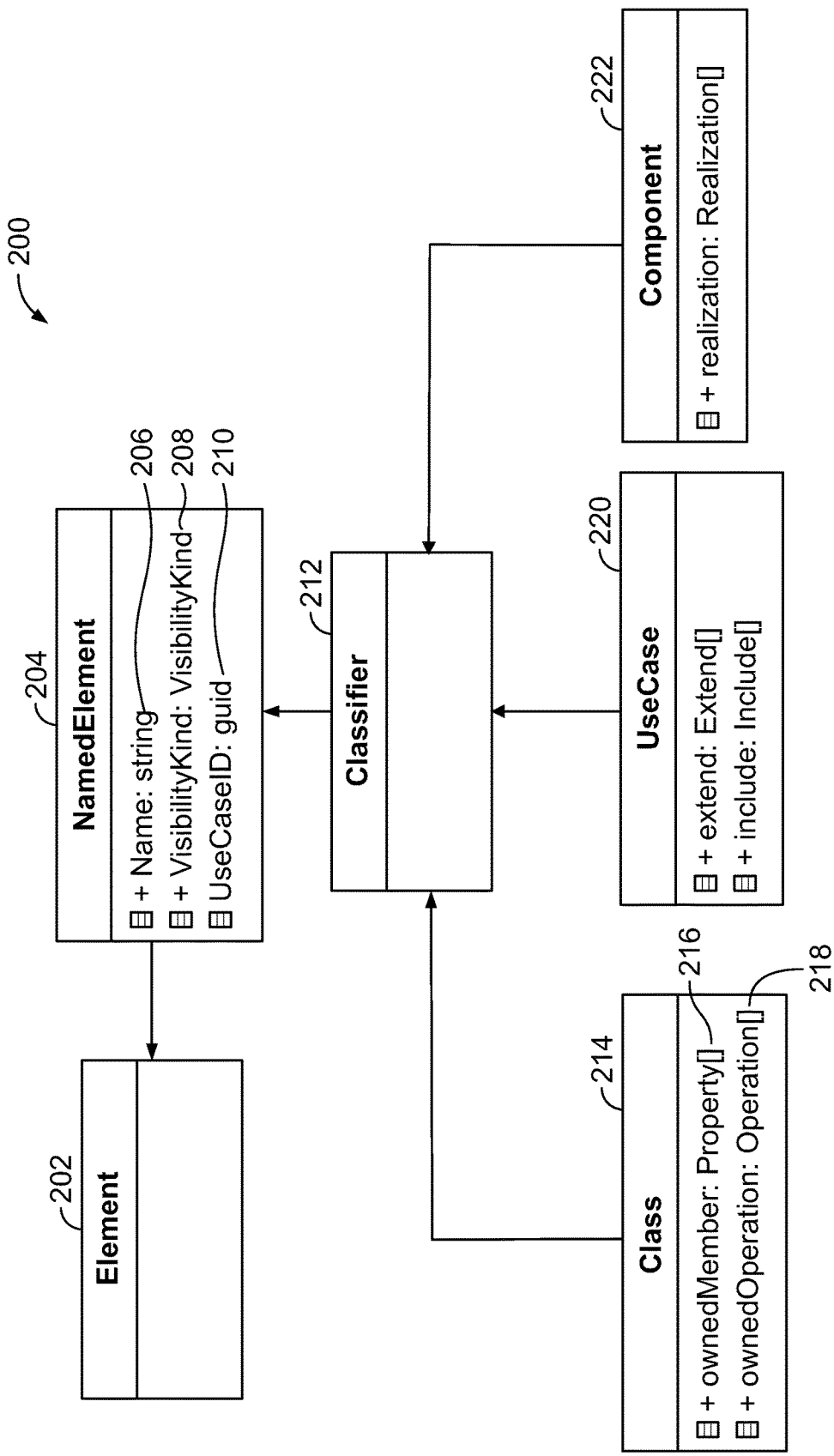
FIG. 2 is a diagrammatic representation of a UML class diagram, according to an embodiment of the present disclosure.

FIG. 2 is a diagrammatic representation of a UML class diagram 200, according to an embodiment of the present disclosure. The UML class diagram 200 illustrates an example of a source for class, use case, and component.

The UML class diagram 200 includes a UML element table 202. Everything in UML derives from a UML element table. The UML element table 202 may be a box, as shown, into which any kind of data may fit.

The UML class diagram 200 may also include a named element table 204. The named element table 204 is a type of element. Components of the UML class diagram 200 underneath the named element table 204 (as shown in FIG. 2) are attributes of the named element table 204. The named element table 204 may include a name 206, a visibility kind 208, and a qualified name 210. The name 206 may be a general name, such as a general name for a particular system. For example, the name 206 may be "aircraft." The visibility kind 208 indicates if the named element 204 is to be visible for analysis. The qualified name 210 is a unique name for particular system. For example, the qualified name 210 may be "Boeing 737."

The UML class diagram 200 may also include a general classifier table 212. The general classifier table 212 is used to further isolate data. The components below the general classifier table 212 are specific classifiers.

For example, a class table 214 is one type of specific classifier. The class table 214 may include a property 216 and an operation 218.

A use case table 220 is another type of specific classifier. The use case table 220 indicates how a particular component is to be used. For example, a use case may be "activate engine," and may provide steps for activating an engine.

A component table 222 is another type of specific classifier. The component table 222 provides information regarding a physical implementation of one or more components.

Referring again to FIG. 1, the UML analysis control unit 102 is configured to generate a transformed relational database schema. The UML analysis control unit 102 may create the transformed relational database schema as follows. Because all model elements derive from the named element class, an element table may be used to contain data that are common to all model elements received from UML tools 111, 113, and 115. For example, data such as name, visibility, qualified name, description, label (alias name), and metadata type may be common to all model elements received from the separate and distinct UML tools 111, 113, and 115. In at least one embodiment, a reverse schema may be created, where all leaf classes contain the common data and a database view may be created to simulate the element table.

Virtual classes and model elements that do not have concrete instantiations, other than the element table, may not be implemented as a table. If the virtual class information is needed for analysis purposes, the virtual class information may be created as database views.

The UML analysis control unit 102 may also capture one-to-many relationships, such as with a foreign key on a "many" side of the relationship. The foreign key may reference the element table.

The UML analysis control unit 102 may also capture many-to-many relationships with a tertiary table, with columns representing the left and right side of the many-tomany relationship. Foreign keys may be established on the columns to the element table.

Figure 3:
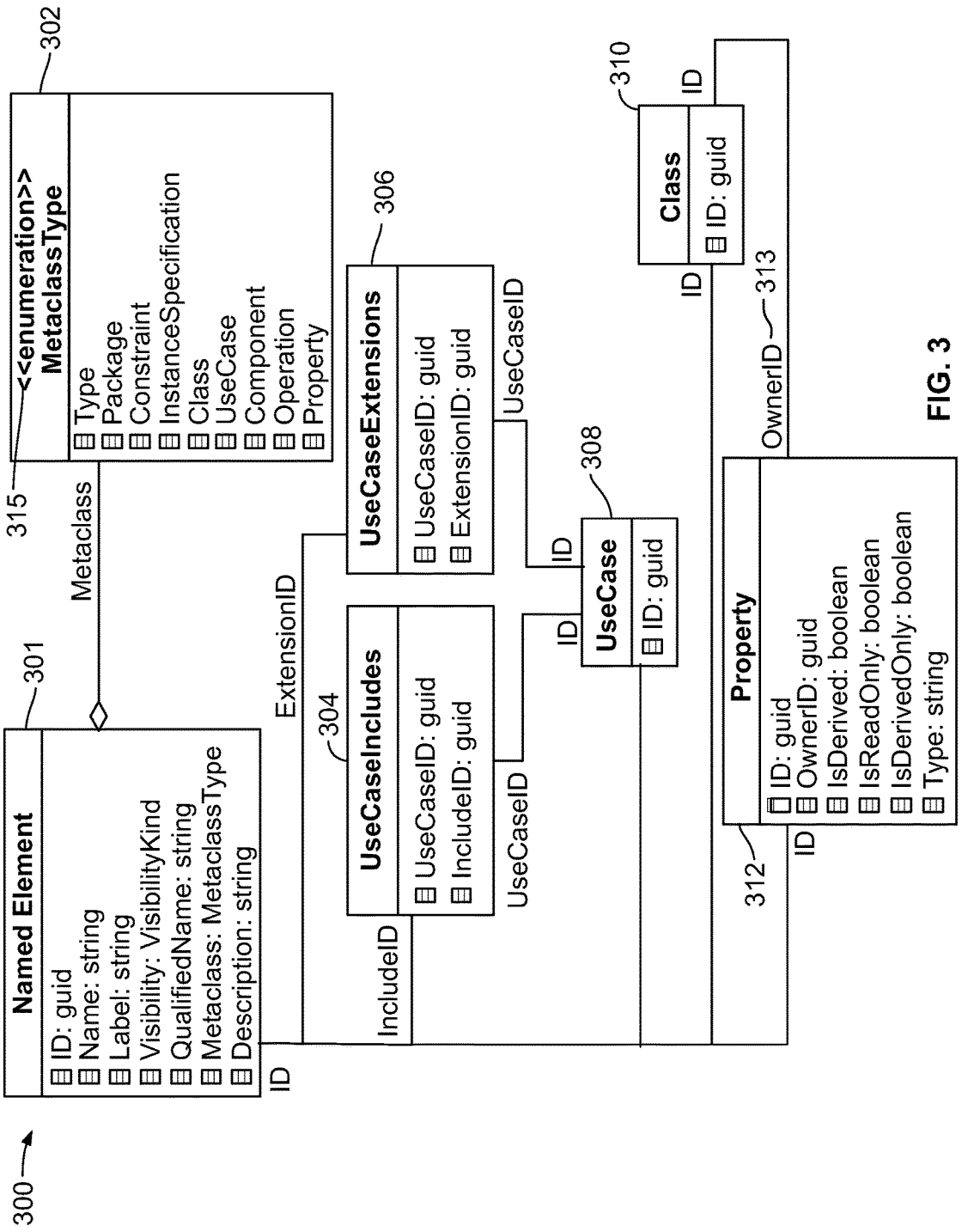
FIG. 3 is a diagrammatic representation of a transformed relational database schema, according to an embodiment of the present disclosure.

FIG. 3 is a diagrammatic representation of a transformed relational database schema 300, according to an embodiment of the present disclosure. The transformed relational database schema 300 is an example of a transformed relational database schema generated by the UML analysis control unit 102. The transformed relational database schema 300 may include a named element table 301, a metaclass type table 302, a use case includes table 304, a use case extensions table 306, a use case table 308, a class table 310, and a property table 312. As shown, each of the named element table 300, the use case includes table 304, the use case extensions table 306, the use case table 308, the class table 310, and the property table 312 may include a global unique identifier (guid or GUID).

The transformed relational database schema 300 may include all of the data contained in a UML class diagram, such as the UML class diagram 200. The GUIDs tie all of the aspects of the transformed relational database schema 300 together. The GUIDs in conjunction with an identifier (ID) (for example, "ID: guid") provides identifications and relationships within the transformed relational database schema 300.

As noted above, the GUIDs may be formed in relation to UML models received from any of the UML tools 111, 113, and 115. The UML analysis control unit 102 derives similar information from each of the received UML models to form the GUIDs. As such, the GUIDs are in a common format. That is, tool-specific UML models from separate and distinct UML tools 111, 113, and 115 are imported by the system 100, and the UML analysis control unit 102 generates GUIDs that are in the same format and convey the same type of information even though the GUIDs are based on information received from separate and distinct UML tools 111, 113, and 115.

One-to-many relationships may be described by an OwnerID column 313 on a dependent object. Tertiary tables within the use case extensions 306 may be used to capture many-to-many relationships. Enumeration table 315 may be or otherwise include the metaclasses defined in the UML superstructure. The enumeration table 315 provides a list of examples. However, it is to be understood that various other metaclasses or data may be included within the enumeration table 315.

As shown in FIG. 3, a table below another table has all the attributes of itself and all the attributes of what is on top of it. For example, the use case table 308 includes all the attributes contained therein, as well as all the attributes of the use case includes table 304, the use case extensions table 306, and the named element table 300. Thus, by assigning GUIDs, lower tables are correlated or otherwise tied to tables thereabove. For example, as shown in FIG. 3, the "ID: guid" is included in each of the property table 312, the class table 310, the use case table 308, the use case extensions table 306, the use case includes table 304, and the named element table 301, thereby correlating or otherwise tying all of those tables together.

The unique identifier, such as "ID: guid," identifies that which is described within a particular table and elsewhere within a UML model. The unique identifier may be correlated with a tool specific globally unique identifier. For example, a tool-specific UML model may have its own set of tool-specific globally unique identifiers. The UML analysis control unit 102 generates its own set of GUIDs and may correlate those GUIDs with respective tool-specific globally unique identifiers of tool-specific UML models. The tool-specific UML models, GUIDs, tool-specific globally unique identifiers (and correlations with the GUIDs), and transformed and translated UML models may be stored in the UML tool database 110.

For example, referring to FIG. 1, the UML analysis control unit 102 receives tool-specific globally unique identifiers from each of the UML tools 111, 113, and 115, and may store the received tool-specific globally unique identifiers in the UML tool database 110. The UML analysis control unit 102 then maps each tool-specific globally unique identifier to a generic globally unique identifier (for example, a GUID), which may be based on a UML standard. As such, the UML analysis control unit 102 is configured to translate particular globally unique identifiers that are specific to particular tools into a universal format, such as a generic globally unique identifier (for example, a GUID).

Figure 4:
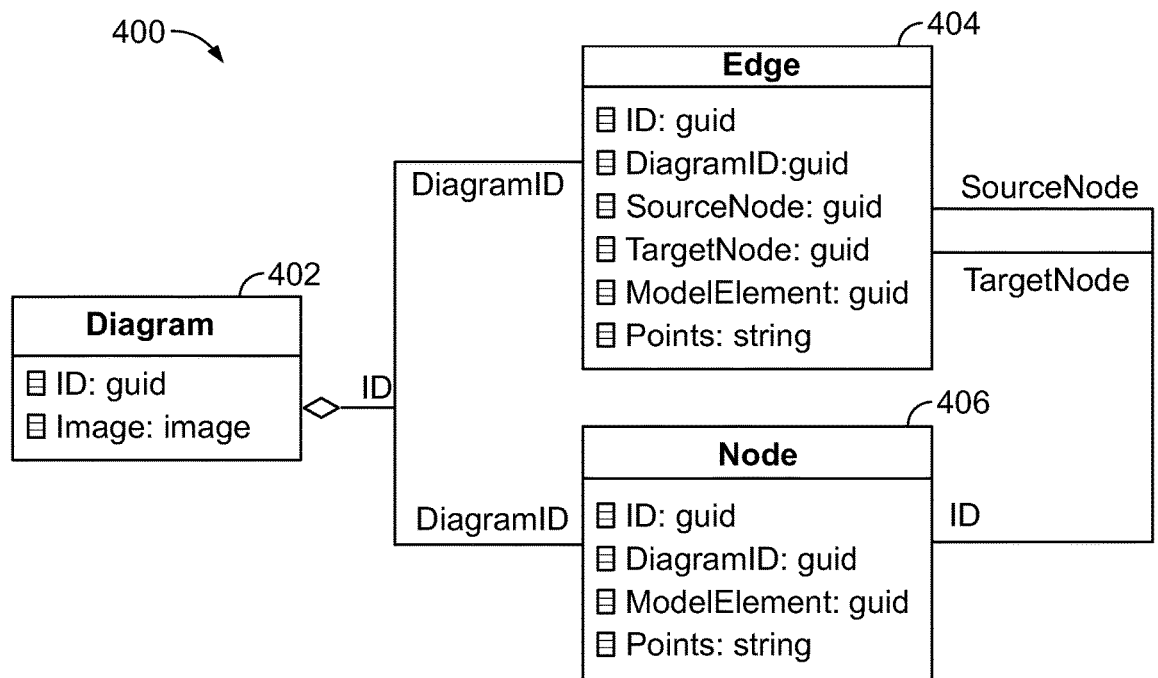
FIG. 4 is a diagrammatic representation of a relational database schema, according to an embodiment of the present disclosure.

FIG. 4 is a diagrammatic representation of a relational database schema 400, according to an embodiment of the present disclosure. Visualization information includes diagrams (that may be represented by elements in the transformed relational database schema 300) and all edges (which represent relationships) and nodes (which represent all other UML constructs). The relational database schema 400 may include a diagram table 402, an edge table 404, and a node table 406.

Referring to FIGS. 1 and 4, the diagram table 402 contains the diagram image, which may be a picture of the diagram (for example, a bitmap, jpg, or the like) that is provided by the native or specific UML tool, such as any one of the UML tools 111, 113, or 115 shown in FIG. 1. The UML analysis control unit 102 is configured to capture a snapshot of the image of the diagram, such as by saving the diagram within the UML tool database 110. By using a snapshot of the image, the rendering routines of the native tools do not have to be recreated.

The edge table 404 may contain a foreign key to the diagram on which the edge resides, as well as the source node and target node of the relationship. The edge table 404 may also contain a foreign key to the model element (model data information) that is represented by the line. The edge table 404 may also contain a string including the points necessary to draw the string. The points may be used to provide hit test functionality on the diagram.

The node table 406, like the edge table 404, may contain the foreign key to the diagram and the represented model element. The node table 406 may also contain a string containing the points used to draw the box.

Any of the UML tools 111, 113, and 115 (that may be a source of UML data that is to be used by the system 100) may be coupled to (such as including or in communication with) one or more transforming mechanisms 117 for extracting the data and transforming it into the UML tool database format. In at least one embodiment, the transforming mechanisms 117 may include plugins for extracting the data and transforming it into a UML tool database format that may be stored in the UML tool database 110. In at least one other embodiment, the UML analysis control unit 102 may be include or otherwise be coupled to the transforming mechanism(s) 117, such as one or more plugins that are configured to communicate with the UML tools 111, 113, and 115, and/or circuits that are configured to transform data received from the UML tools 111, 113, and 115. Each transforming mechanism 117 may be unique to each of the UML tools 111, 113, and 115 using a native API that is unique to a particular UML tool 111, 113, and 115.

In order to render a native model received from one of the UML tools 111, 113, or 115, the UML analysis control unit 102 iterates or otherwise cycles through all elements in the tool-specific UML model. For example, the UML analysis control unit 102 may translate the element type of the native tool to a UML element type, such as a UML2 element type. The translation may be unique to each UML tool 111, 113, and 115.

For example, in RSA, model objects may have keywords. The keywords map to a UML2 stereotype object. As another example, in Rhapsody, there is a single element type called a state. The object is examined and, based on the state type, may be translated as one of the following UML2 model elements: Call Behavior, Call Operation, Flow Final, or Action. After the element is translated, the translated element data is saved and stored in the UML tool database 110.

Additionally, the UML analysis control unit 102 may iterate or otherwise cycle through all diagrams in a tool-specific model received from one of the UML tools 111, 113, and 115. For example, the UML analysis control unit 102 may extract snapshots of the diagrams and save the snapshots within the UML tool database 110. The UML analysis control unit 102 may iterate through all edges (such as structures connecting boxes representing relationships) in the diagrams. For example, the UML analysis control unit 102 may retrieve all points defining the line used to draw the edge and convert to a comma delimited string. The UML analysis control unit 102 may retrieve all metadata for the edge (source node, target node, model object edge represents). The UML analysis control unit 102 may then save the edge data within the UML tool database 110.

The UML analysis control unit 102 may iterate or otherwise cycle through all nodes (boxes representing everything but relationships) in the diagrams. For example, the UML analysis control unit 102 may retrieve all points defining a polygon used to draw the node and convert to a comma delimited string. The UML analysis control unit 102 may retrieve model object data that the node represents, and then save the node data in the UML tool database 110.

Referring again to FIG. 1, the system 100 is configured to import or otherwise receive tool-specific UML data (for example, tool-specific UML models) from separate and distinct UML tools 111, 113, and 115 and translate the tool-specific UML data into a universal UML format that may be viewed and analyzed by an end user. The UML analysis control unit 102 receives tool-specific UML data from the separate and distinct UML tools 111, 113, and 115. Each of the UML tools 111, 113, and 115 may generate tool-specific UML data in a unique tool-specific format. For example, the UML tool 111 may generate UML data in a first native format, the UML tool 113 may generate UML data in a second native format, and the UML tool 115 may generate UML data in a third native format. The first, second, and third native formats may differ from one another. The UML tool database 110 provides a repository for importing and storing UML data (for example, UML model data) and images from the separate and distinct UML tools 111, 113, and 115.

The UML analysis control unit 102 captures each of the tool-specific UML models (in their native formats) as snapshots of the UML models. The UML analysis control unit 102 may capture the tool-specific models as they are imported, or at a later time. The snapshot of each UML model includes text and images of one or more diagrams. Each snapshot may include a universal data store schema that includes diagram images in computer viewable image format, such as including bmp, jpg, wmf, png, and/or raw model data. During the capturing of the tool-specific models, a transforming mechanism, such as a plugin or circuit, may transform a tool-specific UML model into a universal UML format that may be stored in the UML tool database 110. The transforming mechanism 117 may utilize an API of a specific UML tool to transform the tool-specific model into the universal UML format, for example. The UML analysis control unit 102 may extract base data and a plurality of associated extended elements. The snapshot may include both the base data and the extended elements. Each snapshot may be stored in the UML tool database 110 under a filing format that includes a plurality of sortable categories. The monitor 104 may display a viewing tool that is configured to provide access to the UML tool database 110.

The UML tool database 110 may include snapshots of UML models that originated from different UML tools 111, 113, and 115. The different UML tools may include Rhapsody, RSA, Enterprise Architect, Visio, Rational Rose, and System Architect, for example.

Figure 5:
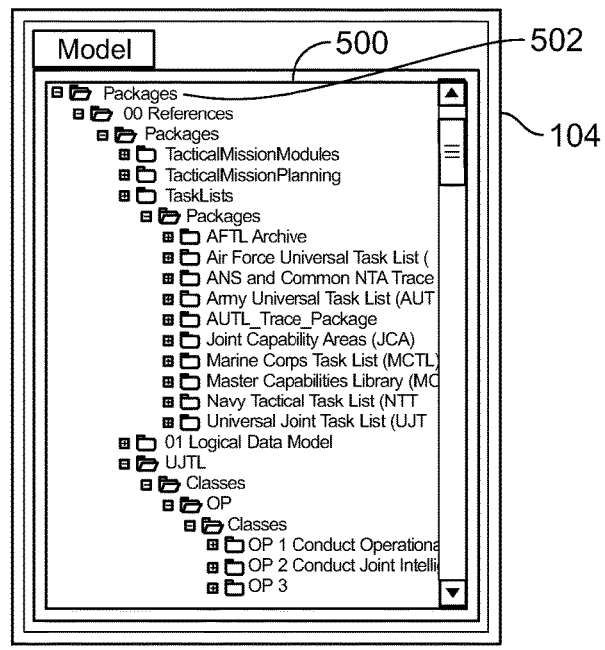
FIG. 5 illustrates a model navigation interface displayed on a monitor, according to an embodiment of the present disclosure.

FIG. 5 illustrates a model navigation interface 500 displayed on the monitor 104, according to an embodiment of the present disclosure. The model navigation interface 500 may be generated, displayed, and controlled by the UML analysis control unit 102 (shown in FIG. 1), and/or another control unit within the system 100. A UML model may be shown as a hierarchy 502. Current UML tools may use a tree view to navigate the model. Because the system 100 (shown in FIG. 1) imports information from the tool-specific UML models, a single model navigation function, such as the model navigation interface 500, may duplicate the navigation features of the specific UML tool. The model navigation interface 500 allows an individual to drill-down to a desired element for viewing, allowing the individual to view a diagram or view properties of a particular element.

Through use of the model navigation interface 500, an individual may find elements in a UML model that represent diagrams. When desired, the individual may input commands through the model navigation interface 500 to retrieve the diagram snapshot from the UML tool database 110 (shown in FIG. 1), as well as all of the nodes and edges that belong to the diagram. The nodes and edges may contain the geometric data defining their layouts, thereby allowing hit tests to be performed on the diagram, and allowing the user to select an object on the diagram as an alternative way to view its properties.

Every element in a UML model has properties. By identifying a specific element (either through the model navigation interface 500 or by clicking on an element on a diagram), the UML analysis control unit 102 may interrogate the UML tool database 110 and retrieve all properties associated with the particular element. The layout display may include a single display layout, regardless of the layout of a UML tool from which the UML model was retrieved.

Figure 6:
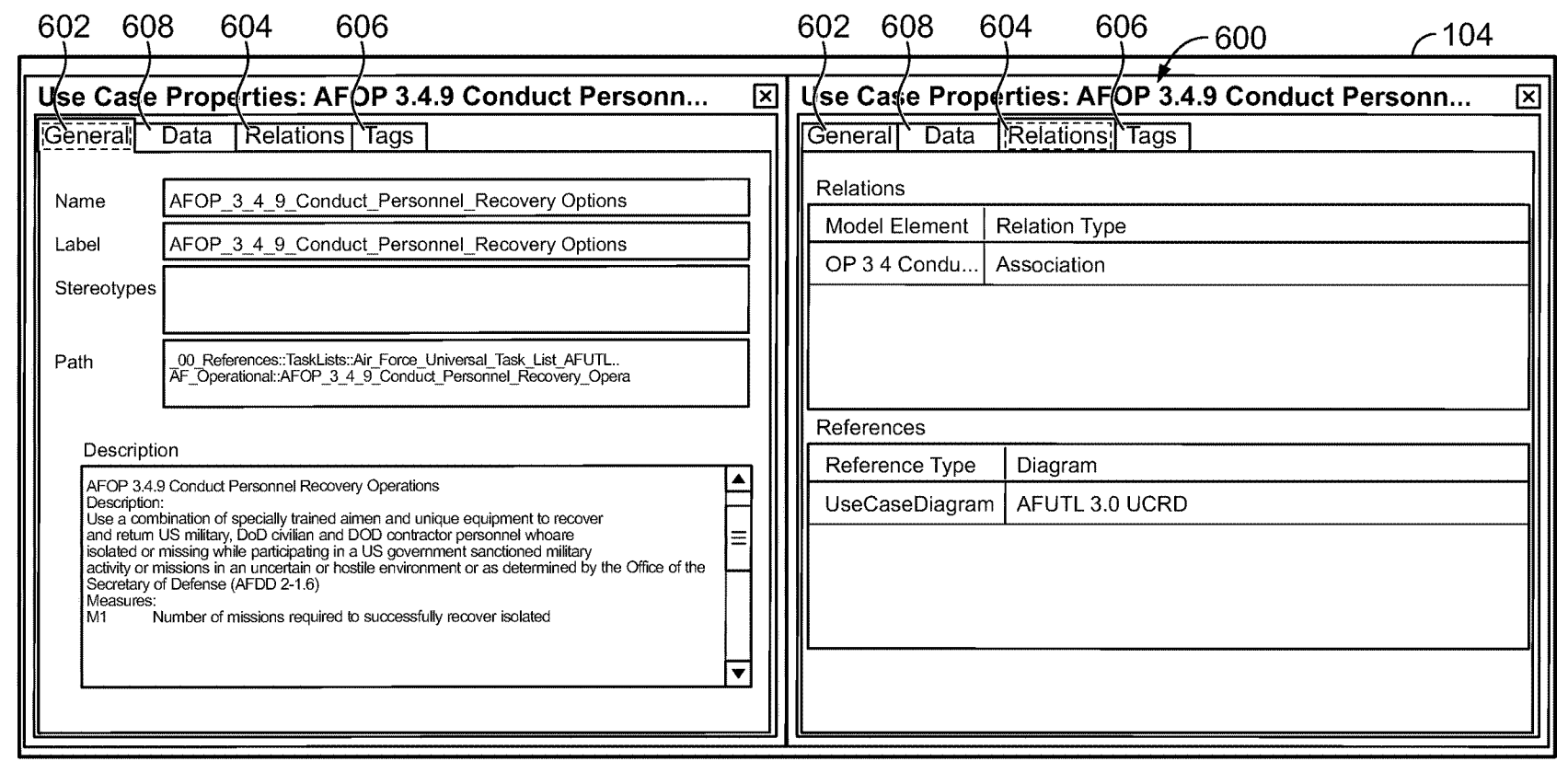

FIG. 6 illustrates a UML model data layout 600 displayed on the monitor 104, according to an embodiment of the present disclosure. A general tab 602, a relations tab 604, and a tags tab 606 may contain data that is common to all different model element types. Because different model elements have different kinds of data (called metadata) assigned thereto, a detail tab 608 may contain a table containing key-value pairs that complete a data definition for the model element.

Referring again to FIG. 1, the UML analysis control unit 102 may also operate to allow an individual to directly access the UML tool database 110 to perform read-only queries against the model data. The queries may be used for quality control, project management, and/or general information. Each query may be saved for future use, creating a repository of quality control, project management, and/or general information predefined queries. The results may be saved to spreadsheets for further post-processing.

Figure 7:
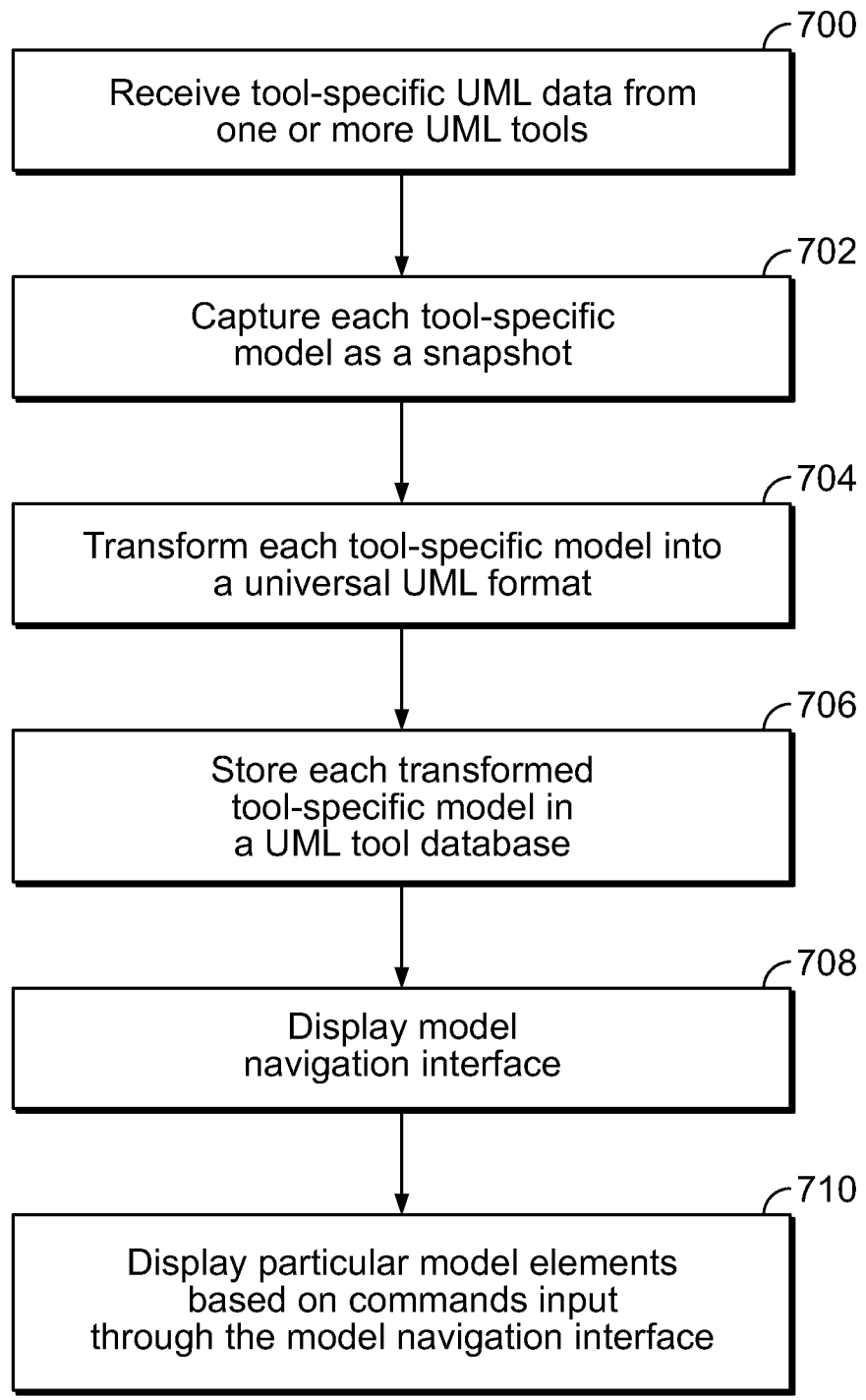
FIG. 7 illustrates a flow chart of a UML analysis method, according to an embodiment of the present disclosure.

FIG. 7 illustrates a flow chart of a UML analysis method, according to an embodiment of the present disclosure. The UML analysis control unit 102 (shown in FIG. 1) is configured to perform the operations shown in the flow chart of FIG. 7. For example, the UML analysis control unit 102 may include at least one processor, and a memory coupled to the processor(s). The memory stores program instructions that are executable by the processor(s) to perform the operations shown and described in the flow chart.

The method is configured to translate tool-specific UML data received by separate and distinct UML tools and translate the tool-specific UML data into a universal UML format that may be viewed and analyzed by an end user. At 700, tool-specific UML data is imported or otherwise received from one or more separate and distinct UML tools. As noted above, each of the UML tools may generate tool-specific UML data in a unique tool-specific format.

At 702, each tool-specific UML model (in its native format) is captured as a snapshot. The snapshot of each UML model includes text and images of one or more diagrams. Each snapshot may include a universal data store schema that includes diagram images in computer viewable image format, such as including bmp, jpg, wmf, png, and/or raw model data.

At 704, each tool-specific model is transformed into a universal UML format, such as through a transforming mechanism 117 (such as a plugin or a circuit). At 706, each snapshot is stored in a UML tool database 110. At 708, a model navigation interface may be displayed on a monitor. Then, at 710, particular model elements may be displayed based on commands input through the model navigation interface.

As described above, embodiments of the present disclosure provide systems and methods for quickly and easily gaining access to information from multiple UML tools. Embodiments of the present disclosure provide UML analysis systems and methods that are configured to translate tool-specific UML models into a universal UML format.

Components of the systems may include or represent hardware circuits or circuitry that include and/or are connected with one or more processors, such as one or more computer microprocessors. The operations of the methods described herein and the systems may be sufficiently complex such that the operations cannot be mentally performed by an average human being or a person of ordinary skill in the art within a commercially reasonable time period. For example, analyzing the numerous elements within each tool specific UML model and translating each UML model into a universal UML format generally takes into account a large amount of factors, relies on relatively complex computations, and involves examination of many permutations of different potential sequences, and the like, such that such a person cannot complete the operations within a commercially reasonable time period to have the UML model elements ready for review by individuals. The hardware circuits and/or processors of the UML analysis systems may be used to significantly reduce the time needed to generate the translated UML models such that they are generated within commercially reasonable time periods.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable persons skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A universal modeling language (UML) analysis method, comprising:
    importing a plurality of tool-specific UML models from a plurality of UML tools, wherein the plurality of tool-specific UML models are in different tool-specific formats;
    capturing snapshots of the plurality of tool-specific UML models, wherein the snapshots comprise text data and diagrams;
    translating each of the plurality of tool-specific UML models into a transformed UML model having a universal UML format, wherein the translating operation comprises extracting base data and one or more associated extended elements from each of the tool-specific UML models;

storing the transformed UML models within a UML tool database, wherein the transformed UML models comprises text data correlated with at least one diagram;
displaying a model navigation interface on a monitor; and
displaying particular model elements based on commands input through the model navigation interface.

2. The UML analysis method of claim 1, wherein each of the plurality of tool-specific UML models has a unique tool-specific UML format, and wherein the universal UML format differs from any of the unique tool-specific UML formats.

3. The UML analysis method of claim 1, wherein the translating comprises using at least one transforming mechanism including at least one plugin coupled to at least one of the plurality of UML tools.

4. A universal modeling language (UML) analysis system, comprising:
   at least one processor;
   a memory coupled to the at least one processor, wherein the memory stores program instructions,
   wherein the program instructions are executable by the at least one processor to: import at least one tool-specific UML model from at least one UML tool, capture a snapshot of the at least one tool-specific UML model, wherein the snapshot comprises text data and at least one diagram, translate the at least one tool-specific UML model into at least one transformed UML model having a universal UML format;
   at least one transforming mechanism configured to translate the at least one tool-specific UML model into the universal UML format, wherein the transforming mechanism is configured to extract base data and one or more associated extended elements from the tool-specific UML model; and
   a monitor coupled to the at least one processor, wherein the at least one processor is configured to display a model navigation interface on the monitor, and display particular model elements based on commands input through the model navigation interface.

5. The UML analysis system of claim 4, further comprising a UML tool database, wherein the at least one processor is configured to store the at least one transformed UML model in the UML tool database.

6. The UML analysis system of claim 4, wherein the at least one transformed UML model comprises text data correlated with at least one diagram.

7. The UML analysis system of claim 4, wherein the at least one transforming mechanism includes at least one plugin coupled to the at least one UML tool.

8. The UML analysis system of claim 4, wherein the at least one transforming mechanism is coupled to the at least one processor.

9. The UML analysis system of claim 4, wherein the program instructions are executable by the at least one processor to import a plurality of tool-specific UML models from a plurality of UML tools, wherein the plurality of tool-specific UML models are in different tool-specific formats, and wherein the program instructions are executable by the at least one processor to translate the plurality of tool-specific UML models into a plurality of transformed UML models, wherein each of the plurality of transformed UML models is in the universal UML format.

10. The UML analysis system of claim 4, wherein the at least one tool-specific UML model has at least one tool-specific format, and wherein the universal UML format differs from any tool-specific format.

11. The UML analysis system of claim 4, wherein the at least one tool-specific UML model comprises a plurality of tool-specific UML models, wherein each of the plurality of tool-specific UML models has a unique tool-specific UML format, and wherein the universal UML format differs from any of the unique tool-specific UML formats.

12. A universal modeling language (UML) analysis method that utilizes at least one processor to execute program instructions stored on a memory, the method comprising:
   importing at least one tool-specific UML model from at least one UML tool;
   capturing a snapshot of the at least one tool-specific UML model, wherein the snapshot comprises text data and at least one diagram;
   translating by at least one transforming mechanism the at least one tool-specific UML model into at least one transformed UML model having a universal UML format, wherein the translating operation comprises extracting base data and one or more associated extended elements from the at least one tool-specific UML model;
   display a model navigation interface on a monitor coupled to the at least one processor; and
   displaying particular model elements based on commands input through the model navigation interface.

13. The UML analysis method of claim 12, further comprising storing the at least one transformed UML model within a UML tool database.

14. The UML analysis method of claim 12, wherein the transformed UML model comprises text data correlated with at least one diagram.

15. The UML analysis method of claim 12, wherein the at least one transforming mechanism includes at least one plugin, and wherein the method further comprises coupling the at least one plugin to the at least one UML tool.

16. The UML analysis method of claim 12, further comprising coupling the at least one transforming mechanism to at least one processor of a UML analysis control unit.

17. The UML analysis method of claim 12, wherein the at least one tool-specific UML model has at least one tool-specific format, and wherein the universal UML format differs from any tool-specific format.

18. The UML analysis method of claim 12, wherein the at least one tool-specific UML model comprises a plurality of tool-specific UML models, wherein each of the plurality of tool-specific UML models has a having unique tool-specific UML format, and wherein the universal UML format differs from any of the unique tool-specific UML formats.

\* \* \* \* \*